Feb. 28, 1961 K. M. RICHARDSON 2,972,816
ALIGNING AND LEVELING DEVICE
Filed Feb. 20, 1958 4 Sheets-Sheet 1
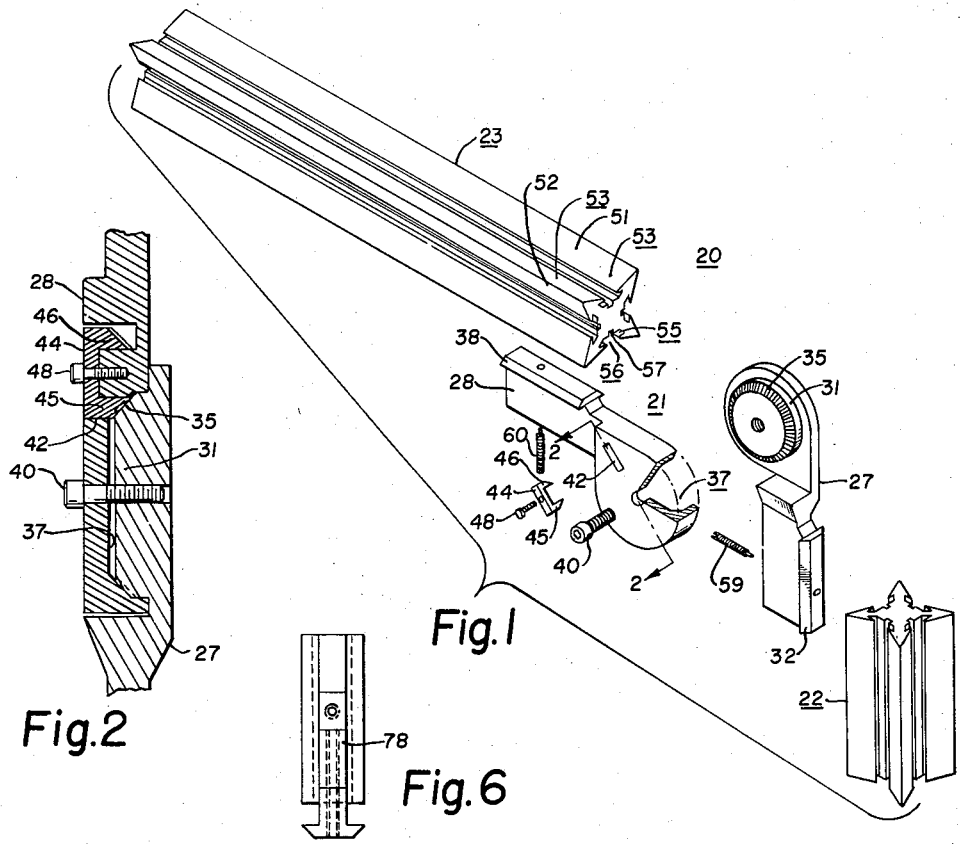
Fig.1
Fig.2
Fig.6
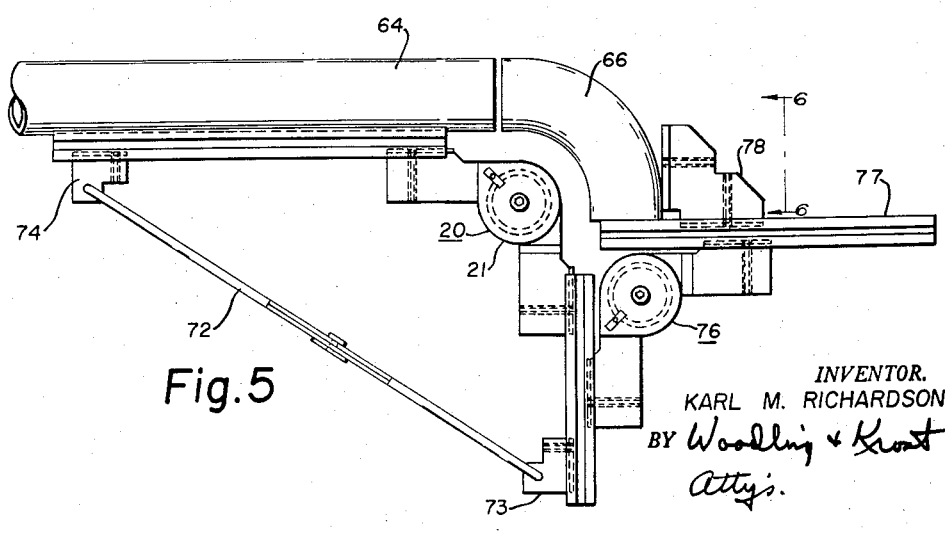
Fig.5
INVENTOR.
KARL M. RICHARDSON
BY Woodling & Krost
Attys.

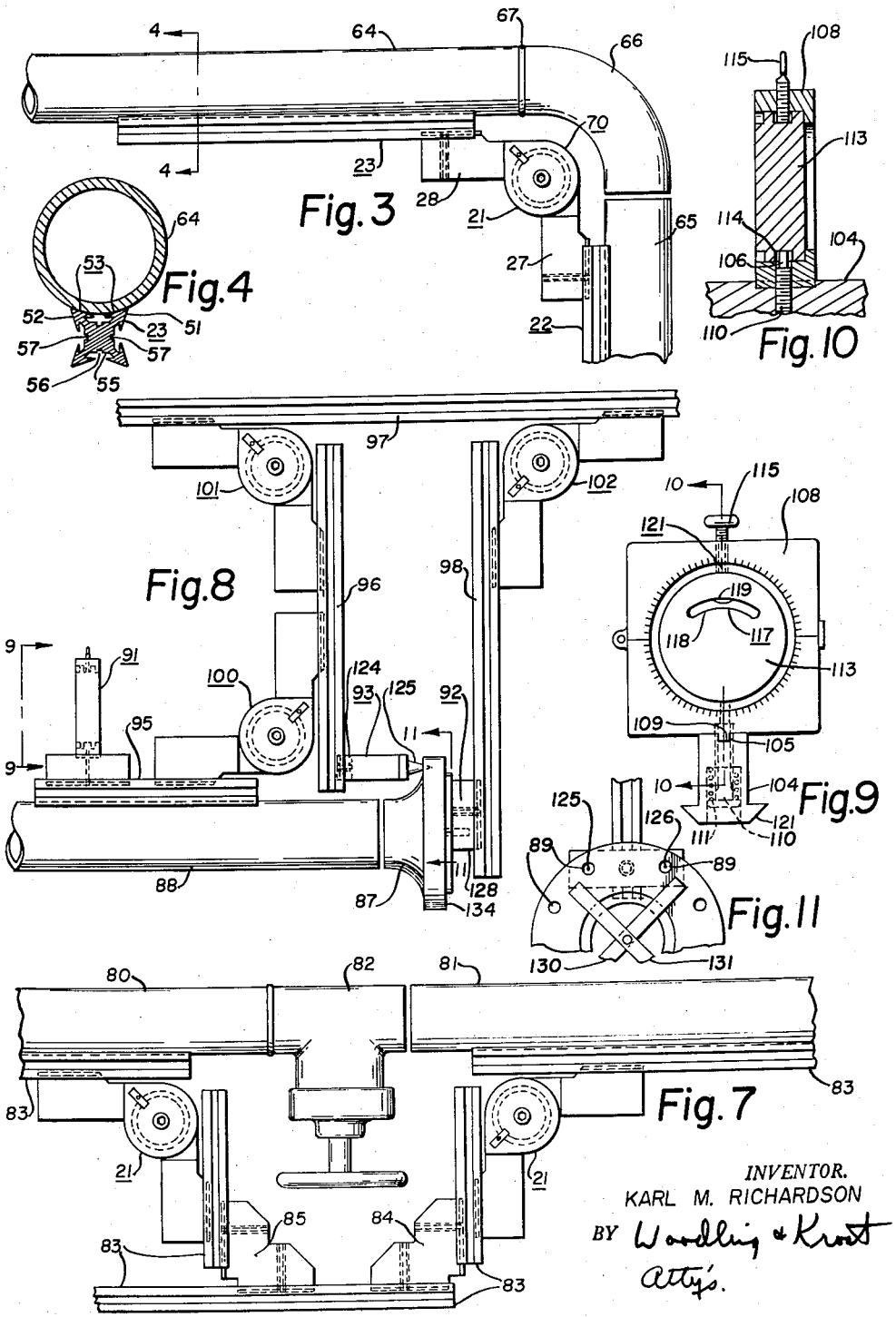

Feb. 28, 1961  K. M. RICHARDSON  2,972,816
ALIGNING AND LEVELING DEVICE
Filed Feb. 20, 1958  4 Sheets-Sheet 3

INVENTOR.
KARL M. RICHARDSON
BY Woodling + Krost
ATTORNEYS

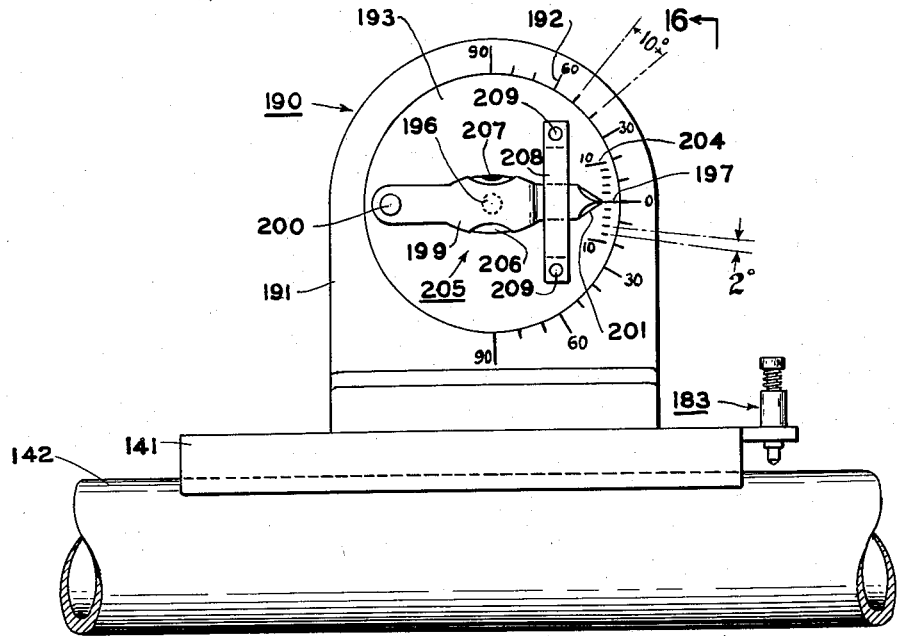
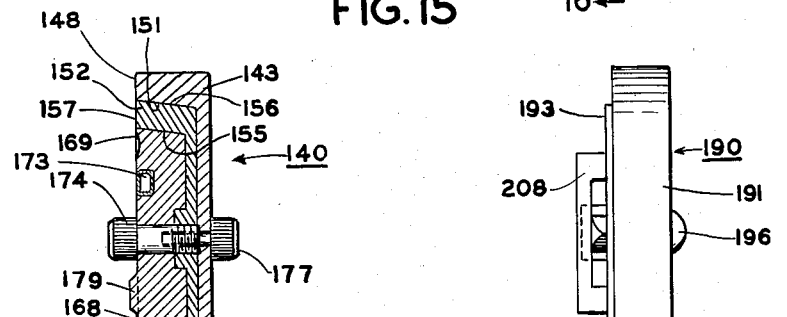
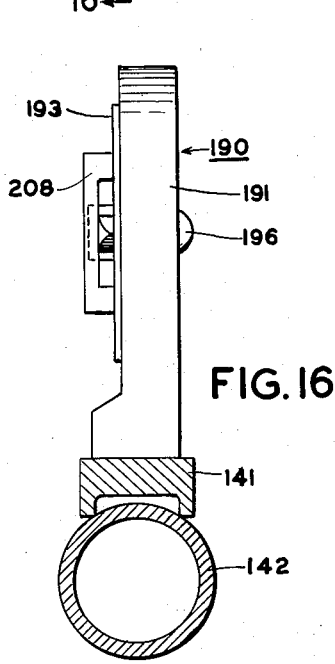
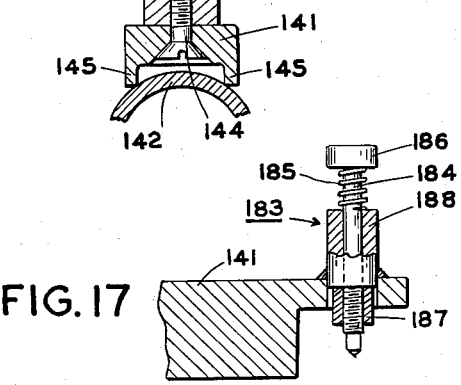
FIG. 15
FIG. 14
FIG. 16
FIG. 17
INVENTOR.
KARL M. RICHARDSON
BY Woodling & Krost
ATTORNEYS

United States Patent Office 2,972,816
Patented Feb. 28, 1961.

2,972,816

ALIGNING AND LEVELING DEVICE

Karl M. Richardson, 609 N. Hamilton St., Dalton, Ga.

Filed Feb. 20, 1958, Ser. No. 716,403

7 Claims. (Cl. 33—189)

The invention relates in general to a device for aligning members with respect to each other and more particularly to a device for aligning two pieces of pipe at a predetermined angle with respect to each other which device has bypass wall means for bypassing a fitting between the pieces of pipe. The invention also relates in general to a leveling device for determining angular positions with respect to horizontal and vertical planes.

In the fabrication of welded pipe, the present method of aligning pipe and the various pipe fittings, such as elbow, T's, flanges, and reducers which are to be connected by welding each to the other is rather awkward and inaccurate. At the present time, the steel square and the carpenter's level are used for aligning pipe and fittings. The present device is designed to replace the carpenter's square and in many instances, the level. This device will enable the mechanic to fit the pieces of pipe and fittings in all phases of fabrication for which it is designed as will be explained in the forthcoming description and illustrated in the accompanying drawings.

The basic form of the aligning device includes two sides that may be adjusted to varying angular relationships with respect to each other, these two sides being joined by interconnecting means or an interconnecting member having wall means which eliminate the mechanical vertex so as to bypass the inside corner of the angle, and as a consequence, bypass the fitting or bend which is to interconnect two pieces of pipe. This aligning device progresses from a basic construction to various adjustments and adaptions as will be hereinafter fully set forth. The present aligning device is peculiarly adapted to square up and align the bolt holes in a flange with respect to a length of pipe to which it is to be subsequently interconnected. The device is also adapted to determine various angular positions about the circumference of a piece of pipe with respect to a vertical plane.

An object of the invention is to provide an aligning device having side members with wall or surface means to engage respective pipe components which components have been or are to be connected by connection means, and having interconnecting means connecting the side members together which interconnecting means has wall means to bypass the connection means.

Another object is to provide an aligning device having pivot means interconnecting two side members with a unique means of securing and varying the angular relationship between the side members.

Another object of the invention is to provide an aligning device with adjustable pivot means interconnecting two side members whereby the side members may be angularly adjusted with respect to each other.

Another object of the invention is to provide an aligning device with side extension members having means for longitudinally adjusting the side extension members relative to the pivot means which interconnect them.

Another object of the invention is to provide an aligning device with a side extension member having a plurality of side portions with similar construction and having first and second pipe engaging members with surface means to cradle or engage a pipe or similar member.

Another object of the invention is to provide an aligning device for bypassing an obstruction between two members and determining the angular relationship between the members.

Another object of the invention is to provide an aligning device for aligning the holes in a flange at a predetermined angular position with respect to a piece of pipe and for squaring the flange with respect to the pipe.

Another object of the invention is to provide a leveling device for determining angular positions with respect to a vertical plane.

Another object of the invention is to provide a leveling device for determining if and when a pipe or similar member resides in a horizontal plane.

Another object of the invention is to provide a device which is capable of determining the position of a member relative to the horizontal.

Another object of the invention is to provide a device which is capable of being pre-set so that it may be determined when a member has been moved and to what extent it has been moved.

Another object of the invention is to provide a device for indicating relative angular positions from the vertical and horizontal.

Another object of the invention is to provide a leveling device which has means for marking a member which the device is being utilized with.

Another object of the invention is to provide a leveling device which includes a housing or support structure and a rotatable annular block member with indicia on either one or both of the same indicating predetermined angular increments and a vernier member cooperating with the support structure and block member for indicating predetermined smaller angular increments.

Another object of the invention is to provide a leveling device which includes a housing, a vernier member and an annular block member with each of the members being tapered in configuration to facilitate their mounting with the housing and means in the device for alternately permitting and prohibiting movement between the two members and also means for alternately permitting and prohibiting movement between the members and the housing.

Another object of the invention is to provide a leveling device including vernier and block members having handle members for enabling an operator to easily move the members.

Other objects and a fuller understanding of the invention may be had by referring to the following detailed description and claims, taken in conjunction with the accompanying drawings, in which:

Figure 1 is an exploded isometric view partially in section of the aligning device of the present invention;

Figure 2 is a fragmentary view in section taken along the line 2–2 of Figure 1;

Figure 3 is a side elevational view of the aligning device, illustrating its use in aligning two pieces of pipe which are to be interconnected by a ninety degree elbow;

Figure 4 is a view taken along the line 4–4 of Figure 3;

Figure 5 is a side elevational view illustrating the aligning device in its function of aligning a ninety degree elbow to a straight run of pipe;

Figure 6 is a view taken along the line 6–6 of Figure 5 showing a corner block member without showing the side extension member to which it is secured;

Figure 7 is a side elevational view illustrating a modification of the aligning device being used to align two pieces of pipe which are to be interconntected by a valve;

Figure 8 is a side elevational view showing the use of the aligning device in its function of squaring and aligning the bolt holes of a flange with respect to a straight run of pipe;

Figure 9 is a view taken along the line 9—9 of Figure 8;

Figure 10 is a view taken along the line 10—10 of Figure 9;

Figure 11 is a view taken along the line 11—11 of Figure 8;

Figure 14 is a view taken generally along the line 14—14 of Figure 12;

Figure 15 is a side elevational view of a still further modified form of the leveling device;

Figure 16 is a view taken generally along the line 16—16 of Figure 15; and

Figure 17 is a fragmentary view showing in more detail a marking assembly shown in Figures 12, 13 and 15.

Figure 12:
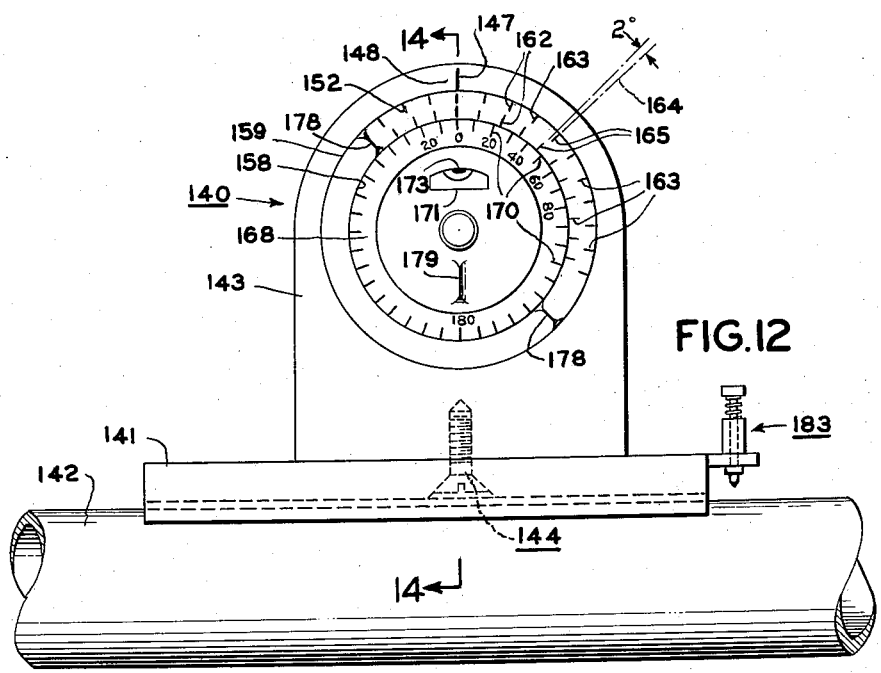
Figure 12 is an elevational view of a modified form of a leveling device from that shown in Figures 8 and 9.

Referring to Figure 1, the aligning device 20 includes generally a hinge block assembly 21 and first and second side extension members 22 and 23, respectively. The side extension members 22 and 23 have been shown in Figure 1 as being of varying longitudinal extent and it should be readily recognized that they may be both made of equal length or of varying length. The basic construction of each of the side extension members is substantially identical.

The hinge block assembly 21 comprises first and second relatively rotatable block members 27 and 28, respectively. The first block member 27 has a generally circular pivot member 31 at one end portion thereof and has a flanged portion 32 at the other end portion thereof. The pivot member 31 is provided with a plurality of serrations 35 which extend around the circumference thereof. The second block member 28 has wall means defining a generally circular socket 37 at one end portion thereof and a flange portion 38 similar to the flanged portion 32 on the other block member. The pivot member 31 fits in the socket 37 in the assembled device and a pivot member 40 secures the pivot member 31 within the socket 37 and permits relative rotational movement between the first and second block members. The second block member 28 has an opening 42 which extends from a side of the block opposite the socket into the socket and adjacent the serrations 35 on the pivot member 31. A locating member 44 having first and second fingers 45 and 46, respectively, resides in the opening 42 (Figure 2). Each of the fingers 45 and 46 have serrations thereon which are adapted to alternately intermesh with the serrations 35 on the pivot member 31 depending on how the locating member 44 is placed in the opening 42, to secure the first and second block members from rotative movement with respect to each other. Means which includes a bolt 48 is provided for securing the locating member into tight engagement with the pivot member 31. The first and second block members are provided with suitable marks (not shown) to indicate their relative rotational positions with respect to each other. The serrations on the first finger 45 of the locating member 44 are offset with respect to the serrations on the second finger 46, thereby providing a fractional angular adjustment between the block members which varies depending on which finger is used to engage the pivot member 31.

Each of the first and second side extension members 22 and 23, respectively, comprises four side portions which are of substantially identical construction so that these side portions may be used interchangeably. Each of the side portions is provided with first and second pipe engaging members 51 and 52, respectively, each of which have surface means 53 to cradle the piece of pipe which is to be aligned. With the use of two pipe engaging members, the side extension member can be quite easily located parallel to the piece of pipe which it engages, which is, of course, essential if there is to be any accuracy in the alignment of two pieces of pipe. The engagement of the surface means 53 with the piece of pipe is best seen in Figure 4 of the drawings. Each of the first and second pipe engaging members has wall means 55 which define a channel 56 which extends longitudinally of the side extension member. These wall means also provide a key-way 57 located at the base of the channel and which extends generally in the same longitudinal direction.

The flange portion 32 of the first block member 27 resides in a channel 56 of the first side extension member and a screw 59 extends through the first block member and into the key-way 57 at the base of the same channel within which the flange portion 32 resides. By the same token, the flange portion 38 of the second block member resides in a channel of the second side extension member 23 and a screw 60 extends into the key-way of the second side extension member to fixedly hold them together. It will thus be seen that the side extension members are capable of a wide range of longitudinal adjustment with respect to the block member with which it cooperates and the provision of the key-way insures that the surface of the channel within which the respective flanged portions reside will not become burred and thus prevent good sliding movement. Any burring which takes place is done down in the key-way. The pivot and socket arrangement of the two block members along with the locating member provide a unique method of varying the angular positioning of the side extension members and thus provide a wide range of use for the device.

One of the many uses of the aligning device hereinabove described is illustrated in Figure 3. Figure 3 shows first and second straight runs of pipe 64 and 65 which are to be interconnected by a ninety degree elbow 66. The elbow 66 is illustrated as being already attached to the pipe 64 by a weld 67. Since the second run of pipe 65 is to be disposed ninety degrees from the first run of pipe, the aligning device 20 is adjusted so that the first and second side extension members 22 and 23 are ninety degrees apart. The side extension members may also be longitudinally adjusted with respect to the block members with which they cooperate as hereinabove described. It will thus be seen that the aligning device can be used to quickly and readily align two runs of pipe before they are connected together or if they have already been fixedly attached the device may be used to measure the angular relationship between the two pipe runs. The hinge block assembly 21 is provided with or includes wall means 70 which serve to bypass or avoid the connection means or corner which is formed by the elbow 66 and the places where the elbow is welded to the respective runs of pipe. In comparing this device to an analogous structure which might be used for this purpose it can be said that the present device avoids the mechanical vertex which would collide or otherwise interfere with the curvature of the elbow and would prevent alignment or measurement between the two pipe runs.

Figure 5 illustrates a modification of the device shown in Figures 1 and 3 and illustrates how the device may be utilized to align a ninety degree elbow which is to be connected to a straight run of pipe. For the sake of clarity, the same reference numerals have been applied to Figure 5 as have been used in Figure 3 where no changes in structure have been encountered. Accordingly, the run of pipe 64 is to be aligned with the elbow 66 so that the two may be welded or otherwise suitably connected together. The aligning device 20 in this modification has been provided with a supporting brace 72 which is connected at opposite end portions to first and second blocks 73 and 74. The blocks 73 and 74 are provided with a flanged construction similar to the flanges 32 and 38 of the block members 27 and 28. They are therefore capable of interfitting and sliding in the channels 56 as are the flanges 32 and 38. The supporting brace 72 is capable of being longitudinally adjusted. In Figure 5, a second hinge block assembly 76 has been utilized, in addition to the hinge block assembly 21, and an additional side extension member 77 has been shown. The side extension member 77 is similar in construction to side extension members 22 and 23. One end of the elbow 66 resides upon the pipe engaging members 51 and 52 of the side extension member 77 and a corner block member 78 slides in the channel 56 of the side extension member 77 and abuts the elbow 66 to hold it in position so that it may be welded to the run of pipe 64.

Figure 7 illustrates a modification of the device shown in Figures 3 and 5 and shows how the device may be utilized for bypassing a large obstruction between first and second runs of pipe 80 and 81 which are to be interconnected by means of a valve 82. In this illustration two hinge block assemblies 21 have been shown and indicated by the same reference numerals since they are identical and the five side extension members which have been shown have been indicated by the same reference numeral 83 for more clarity and it is to be understood that they are of the same construction as the side extension members 22, 23, and 77 which have been described hereinabove. The two side extension members 83 which extend vertically in Figure 6 and which are joined together by the horizontal extension member 83 are interconnected by corner blocks 84 and 85 which are of identical construction to the corner block 78 which is shown in Figure 5. These side extension members and the corner blocks provide wall means or construction means for bypassing the connecting valve 82 so that the two runs of pipe 80 and 81 may be perfectly aligned.

Figures 8 through 11 illustrate the aligning device as being used to square a flange 87 with a run of pipe 88 and to align bolt holes 89 in the flange at a predetermined angular position with respect to the pipe 88. This mechanism shown in Figure 8 includes generally a leveling device 91, a flange squaring device 92, and a two holing device or aligning finger member 93. It should be pointed out at the outset that the problem to be solved by the device illustrated in Figure 8 stems from the fact that the run of pipe 88 would usually have a flange similar to flange 87 already fixedly welded or otherwise suitably secured to the left end of the pipe 88, not shown herein. The problem is to square up the flange 87 and make certain that the bolt holes 89 therein are in alignment with the bolt holes on the flange which is located on the left end of the pipe 88. The four side extension members which have been illustrated in Figure 7 are identical in construction with the extension members 22, 23, 77 and 83 which have been used hereinabove in describing Figures 1, 3, 5 and 7. However, for the sake of clarity in the explanation of Figure 8, these four side extension members have been indicated by the reference numerals 95 through 98. The hinge block assemblies are also identical in construction with the hinge block assemblies hereinabove described but they will also be designated by different reference numerals; namely, numerals 100 through 102, respectively, so that the operation of the device shown in Figure 8 may be more adequately understood. As will be noted, in Figure 8, the extension member 95 is connected to the extension member 96 by the hinge block assembly 100 and the extension member 96 is in turn connected to extension member 97 by hinge block assembly 101. Extension member 97 is connected to member 98 by hinge block assembly 102. In this illustration, each extension member extends substantially at right angles to the adjacent extension member.

The leveling device 91 shown in detail in Figures 9 and 10 includes a mounting block or base 104 which has first and second crossed grooves 105 and 106, respectively, therein. The groove 105 is best shown in Figure 9 and the groove 106 is best shown in Figure 10.

A housing 108 has a raised ridge 109 thereon which is alternately interfittable into one of the crossed grooves to prevent turning movement between the mounting block 104 and the housing 108. The mounting block 104 is suitably drilled and a screw 110 extends through the mounting block and is secured to the housing 108. A spring 111 is interposed between the mounting block 104 and the head of the screw 110 and permits sufficient longitudinal movement between the housing 108 and the mounting block 104 when sufficient force is supplied to overcome the spring so that the housing and mounting block may be turned relative to each other and the ridge 109 may be interfitted into a different crossed groove in the mounting block 104. An annular block 113 having a groove 114 on the periphery thereof resides in the housing 108 with the end of screw 110 and with another screw 115 extending in the groove 114 to retain the annular block within the housing and when screw 115 is tightly engaged with the base of the groove 114, rotative movement of the annular block is prevented. Level means 117 are carried by the annular block and includes generally a transparent shell 118 partially filled with liquid, such as alcohol, which provides a leveling bubble 119. The mounting block 104 is provided with a flange 121 similar to the flange 32 and 38 in Figure 1 which enables the leveling device to be secured and mounted to the side extension member 95. Indication means 121 which comprise suitable marks upon the housing 108 and the annular block 113 indicate relative rotational movement between these two members.

The two-holing device 93 includes generally a mounting block 124 having a flange similar to the flange 121 on the mounting block 104 and is connected to the side extension member 96. This two-holing device comprises first and second fingers 125 and 126 which are adapted to extend into predetermined holes 89 best seen in Figure 11. The flange squaring device 92 includes a mounting block 128 similar to mounting blocks 124 and 104 to which are secured crossed squaring members 130 and 131. These crossed squaring members are adapted to engage a face 134 of the flange 87 to align this face generally normal to the run of pipe 88. Referring to Figure 8, it will be readily apparent that when the leveling device is in the position shown, the leveling bubble will be in the position shown in Figure 9. If the leveling device as a whole is rotated about a point corresponding to the axis of the run of pipe 88, then the leveling bubble would no longer reside in the position shown in Figures 8 and 9. To get the leveling bubble 119 into its uppermost position after the device has been rotated, it would be necessary to rotate the annular block 113 relative to the housing 108 until this were accomplished. The indication means 121 would then indicate how far the leveling device as a whole had been moved about the circumference of the pipe 88.

Accordingly, to utilize the device shown in Figure 8, the device would be turned opposite to the position shown in Figure 8 so that the fingers 125 and 126 of the two-holing device would extend into the holes in the flange which has already been affixed at the left end of the pipe 88 and which has not been shown in Figure 8. The leveling device would then be adjusted by rotating the block 113 in the housing 108 until the leveling bubble had acquired its uppermost position within the shell 118. This would then fix the positioning of the device and it would then be turned to the position shown in Figure 8 and the holes in the flange 87 would be aligned with the fingers 125 and 126. The leveling bubble 119 would indicate when the device was in the correct angular position on the surface of the pipe 88. The crossed squaring members 130 and 131 would of course be brought into engagement with the face of the flange 87 and the correct positioning of the flange relative to the pipe 88 would be assured. The flange would then be secured to the pipe 88 by welding or other suitable means. The positioning of the run of pipe 88 relative to a horizontal plane may also be determined by turning the housing 108 ninety degrees relative to the position in which it is shown in Figure 8. This will indicate whether the run of pipe 88 is horizontal or not.

Figure 13:
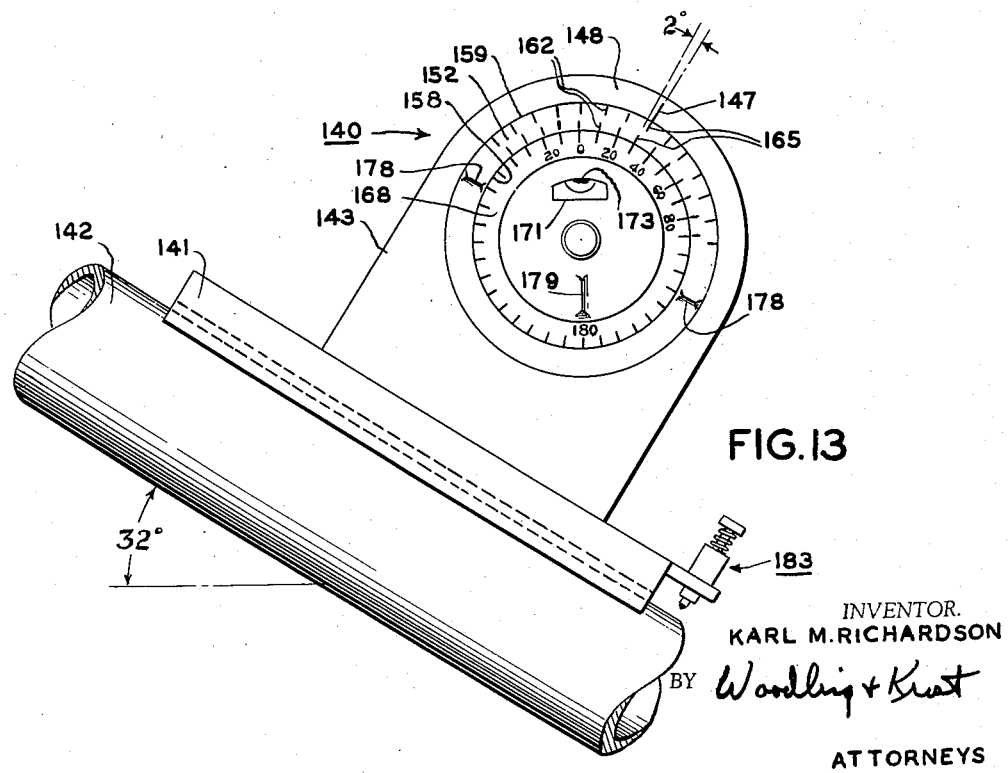
Figure 13 is a view similar to Figure 12, but in a different position.

The modified form of the leveling device shown in Figures 12 through 14 has been indicated generally by the reference character 140 and includes in combination a generally channel shaped base 141 and a housing or support 143. The leveling device 140 has been shown as performing one of its many functions (Figures 12 and 13) in determining when a pipe 142 has been moved from a horizontal plane a predetermined number of degrees. The channel shaped base 141 comprises two spaced and longitudinally extended legs 145 (Figure 14) which are adapted to rest at spaced positions on the outer surface of the pipe 142. Pivot means 144 is provided for pivotally securing the housing 143 to the base 141. The pivot means in this instance includes a screw which extends through a threaded opening in the base and on into a threaded opening in the housing. When the screw is tightened the base and housing are fixed relative to each other and when loosened, the housing and base can be turned relative to each other and thus vary the angular relation of the two elements.

The housing 143 is provided with a front face 148 upon which a positioning mark 147 is inscribed. Wall means 151 (Figure 14) are provided in the housing and define a generally tapered opening thereinto. A tapered annular vernier member 152 resides in the tapered opening in the housing and is adapted to be supported by the wall means 151. The vernier member 152 has inner and outer surfaces 155 and 156, respectively, which meet with a front face 157 and define inner and outer edges 158 and 159, respectively (Figures 12 and 13). Indicia 163 are provided on the front face 157 of the vernier member 152 at the inner and outer edges 158 and 159, respectively, thereof. Adjacent indicia on the inner and outer edges of the vernier member are spaced increasing predetermined angular distances from each other. In other words, observing the vernier member in Figure 12, the second pair of indicia (indicated by reference numeral 162) from the positioning mark 147 are spaced one degree apart. The next pair is spaced one and one-half degrees apart. The fourth pair has been indicated as being two degrees apart, by the dotted lines 164. The succeeding pairs of indicia are spaced at increasing angular distances from each other up to five degrees.

A tapered annular block 168 which has a front face 169 fits inside of and rests on the inner surface 155 of the vernier member 152. Indicia 170 are provided on the front face of the annular block 168 and are spaced at even predetermined angular intervals as indicated, namely, at ten degree intervals. The ten degree intervals have been selected for clarity in illustrating the use of the device. In actual practice, with the vernier subdivisions being in one-half degree increments up to five degrees, it is desirable that the subdivisions on the block member be in five degree increments. The principle, however, is very well illustrated with the increments, as indicated hereinabove. The subdivisions on the block have been only partially numbered from zero (0) to one-hundred eighty (180) degrees and the unnumbered indicia will be readily understood by those skilled in the art. This aids greatly in illustration without unduly burdening the drawing. Level means is carried by the tapered annular block and serves to indicate a horizontal position. The level means includes a glass or similar tube which contains a liquid such as alcohol to form a leveling bubble 173. Means is provided which includes a first screw 174 (Figure 14) with a threaded end portion which extends into threads on the vernier member for allowing and preventing relative rotation between these two elements. Means is also provided which includes a second screw 177 which extends from the back of the housing and into threads on the first screw. This permits an operator to selectively allow and prevent relative rotation between the housing and the annular block and vernier member depending upon whether the screw is tightened or loosened. Two handles 178 are provided on the vernier member and a single handle 179 is provided on the annular block for enabling an operator to rotate the same when it is desirable. A marking assembly 183 is provided at one end portion of the base 141 and is for the purpose of enabling an operator to place a mark upon the pipe 142 so that the position of the leveling device before and after an operation may be readily determined. The marking assembly, which is best shown in Figure 17, includes a sleeve 188 fixedly secured to the base 141 and within which a punch member 184 is adapted to reciprocate. The punch is provided with a head 186 and a spring 185 extends between the top of the sleeve and the head for continuously biasing the punch member to its uppermost position. An abutment member 187 is threadably secured to the lower portion of the punch and limits the upper travel of the punch within the sleeve. In order that an operator mark an object, it is only necessary for him to exert a force upon the head 186 with an instrument, for example a hammer, which causes the point of the punch to engage the pipe after which time the spring 185 returns it to its normal position and the pipe is suitably marked.

In order to illustrate the operation of the device, let it be assumed that one wishes to move the pipe 142, illustrated in Figure 12, from the horizontal position in which it is shown into the position indicated in Figure 13, namely, thirty-two degrees from the horizontal. It is then necessary that the thirty degree indicia on the annular block be brought into register with the indicia 165 on the inner edge of the vernier which is the indicia of the vernier pair which indicates a two degree differential. This is accomplished by loosening screw 174. The screw 174 is then tightened in order that there be no relative rotational movement between the annular block 168 and the vernier 152. The screw 177 is loosened and the vernier and annular block are moved as a unit until the indicia 165 on the outer edge of the vernier of the two degree increment pair matches up with the positioning mark 147. The pipe 142 is then moved from the position shown in Figure 12 toward the position shown in Figure 13. As soon as an angular movement of exactly thirty-two degrees has been traversed, the leveling bubble 173 of the leveling means will move into the position shown to indicate that the required angular movement has been made. The same method may be utilized to determine the number of degrees an object has been moved from the horizontal as distinguished from the hereinabove given example in which it was desired that a predetermined angular movement be made.

The leveling device may also be utilized to determine, for example, the various angular positions around the circumference of the pipe. To accomplish this end, the pivot means 144 is loosened and the housing 143 is rotated relative to the base 141 ninety degrees from the position shown in Figures 12, 13 and 14. The pivot means is again secured after this movement has been made to fix the housing relative to the base. The base may then be moved circumferentially around the periphery of the pipe and the hereinabove described method may be utilized to determine various angular positions. It is in this operation that the marking assembly may be put to its best use in that the various angular positions may be permanently marked by utilizing the punch 184.

The leveling device illustrated in Figures 15 and 16 is a modification of the device shown in Figures 12 through 14. The leveling device in this embodiment has been indicated generally by the reference numeral 190, and includes in combination a housing or support 191 secured to a base which may be identical with the base shown in Figure 12. The housing and base are also secured in the same manner. Indicia 192 are provided on the housing 191 at regularly spaced angular intervals and the intervals in this instance have been indicated as ten degree intervals. The indicia 192 have been shown only on one side of the housing for the sake of clarity in the drawings and it will be readily appreciated that in actual practice the indicia would be applied over a complete 360 degrees. It will also be readily appreciated that these spaced angular intervals may be varied to suit the fine adjustment of the device which is required. It is only in the interest of clarity that these particular angular divisions have been chosen. An annular block 193 is pivotally secured to the face of the housing by pivot means 196 and an indicating mark 197 is inscribed on the annular block which is registrable with the indicia on the housing to indicate the relative positioning between the two elements. A vernier arrangement is provided for the instant leveling device and includes an indicating member 199 secured by pivot means 200 to the annular block 193. The indicating member is provided with an end portion 201 which is registrable with indicia 204 on the annular block member which indicia are regularly spaced at angular intervals which intervals are of a smaller magnitude than the indicia 192 on the housing. These intervals are preferably multiples of the increments on the housing. Because of the pivotal mounting of the indiciating member, the end portion of the indicating member may be moved to coincide with the desired indicia on the annular block. Level means 205 is carried by the indicating member 199 and includes a glass tube 206 containing a fluid, for example alcohol, to a predetermined level to provide a leveling bubble 207. In order to maintain the end portion 201 of the indicating member adjacent the face of the annular block, a strap member 208 is provided which is suitably secured to the annular block as at 209.

In operation, the device of Figure 15, for example, might be as follows. Assume that it be desired to move the pipe in Figure 15, thirty-two (32) degrees from the horizontal in a clockwise direction. To predetermine this thirty-two degrees, it would be first necessary to move the end portion of the indicating member in a counterclockwise direction to the first two degree increment indicia on the annular block member. The indicating mark 197 on the annular block member is next moved in a counterclockwise direction to correspond with the thirty degree indicia on the housing, therefore giving a total angular indication of thirty-two degrees. It will be readily appreciated that the subdividing of the indicia may be made differently without departing from the principle of operation as hereinabove described.

It will therefore be seen that a device has been provided which is capable of being preset so that it may be moved to indicate a predetermined angular movement or which may be first moved and then the angular movement may be determined. The device may also be referred to as a device for indicating the position of a member relative to the horizontal or vertical rather than simply a leveling device. It will also be seen that a novel vernier mechanism has been provided which indicates fine angular movement if this is desired.

It will also be understood that the leveling device of the present invention might be used in many ways for determining angular positions about the circumference of a pipe or other similar objects.

It will thus be seen that the aligning and leveling device establishes the holes in the flange at predetermined angular positions with respect to the run of pipe and also accurately squares the flange with respect to the pipe. With the use of this device the angular positions about the circumference of the pipe are quite easily determined and it is also quite easily determined whether the pipe resides in a horizontal plane or not. It will thus be seen that the device shown and illustrated in Figure 1 is capable of many modifications and adaptations as has been herein shown and described and its use in squaring and aligning a flange for subsequent connection to a run of pipe is only one of the many adaptations for which it may be used.

This application is a continuation-in-part of patent application Serial No. 610,319, filed September 17, 1956, entitled "Aligning Device," now expressly abandoned by applicant.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A leveling device including in combination a channel shaped base, a housing having a front face, pivot means pivotally securing said housing to said base, a positioning mark on said front face of said housing, wall means defining a tapered opening in said housing, a tapered annular vernier member residing in said opening in said housing, said vernier member having inner and outer surfaces defining a front face with inner and outer edges, indicia on said front face of said vernier member at said inner and outer edges thereof, adjacent indicia on said inner and outer edges being spaced increasing predetermined angular distances from each other, a tapered annular block having a front face and residing in said inner surface of said vernier member, indicia on said front face of said annular block and being spaced at even predetermined angular intervals, level means carried by said tapered annular block for indicating a horizontal position, a first screw extending from the front face of said tapered annular block into said vernier member for alternatively allowing and preventing relative rotation between the same, a second screw extending from the back of said housing and into said first screw for alternatively allowing and preventing relative rotation between said housing and said annular block and vernier member, first and second handle members on said vernier member and said annular block respectively for enabling one to rotate the same, a punch member carried by a portion of said channel shaped base and having a spring biasing the same to an inactive position, and said punch member having a head upon which a force may be exerted to cause said punch to mark an object upon which said channel shaped base resides.

2. A leveling device including in combination a base, a housing having a front face, pivot means pivotally securing said housing to said base, a positioning mark on said front face of said housing, wall means defining an opennig in said housing, an annular vernier member residing in said opening in said housing, said vernier member having a front face and an inner surface defining an opening therein, indicia on said front face of said vernier member, adjacent indicia on said front face of said vernier member being spaced increasing predetermined distances from each other, an annular block having a front face and residing in said opening of said vernier member, indicia on said front face of said annular block and being spaced at predetermined angular intervals, level means carried by said annular block for indicating a horizontal position, a first screw extending between said annular block and said vernier member for alternatively allowing and preventing relative rotation between the same, a second screw extending from said housing and to said first screw for alternatively allowing and preventing relative rotation between said housing and said annular block and vernier member, and first and second handle members on said vernier member and said annular block respectively for enabling one to rotate the same.

3. A device including in combination a base, a housing having a front face, pivot means pivotally securing said housing to said base, a positioning mark on said front face of said housing, wall means defining an opening in said housing, an annular vernier member residing in said opening in said housing, said vernier member having a front face and an inner surface defining an opening therein, indicia on said front face of said vernier member, adjacent indicia on said front face of said vernier member being spaced increasing predetermined angular distances from each other, an annular block having a front face and residing in said opening of said vernier member, indicia on said front face of said annular block and being spaced at predetermined angular intervals, level means carried by said annular block for indicating a horizontal position, means for alternatively allowing and preventing relative rotation between said annular block and said vernier member, and means for alternatively allowing and preventing relative rotation between said housing and said annular block and vernier member.

4. A leveling device comprising a mounting block having first and second crossed grooves therein, a housing having a raised ridge thereon interfittable into one of said grooves to prevent turning movement between said block and housing, screw and spring means securing said housing and said block together and permitting sufficient longitudinal movement between said housing and said block to remove said ridge from said groove and thus permit turning movement between said block and housing, an annular block having an annular groove on the periphery thereof and residing in said housing with screw means extending in said annular groove to retain said block in said housing and permit relative movement between said housing and said annular block, level means carried by said annular block and indicating when said annular block is in a predetermined angular position relative to a horizontal plane, and indication means on said annular block and said housing to indicate relative rotational movement therebetween.

5. A device for indicating the position of a member relative to the horizontal including in combination a base, a support member, first pivot means pivotally securing said support member to said base, indicia on said support member at regularly spaced angular intervals, an annular member, second pivot means pivotally securing said annular member to said support member, an indicating mark on said annular member adapted to correspond with said indicia on said support member upon movement of said annular member about said second pivot means, an indicating member, third pivot means pivotally securing said indicating member to said annular member and located a spaced distance from said second pivot means, said indicating member having an end portion, vernier indicia on said annular member at regularly spaced angularly intervals of smaller magnitude than said indicia on said support member, said end portion of said indicating member being angularly movable about said third pivot means to correspond with said vernier indicia on said annular member, and level means carried by said indicating member for indicating a horizontal position.

6. A device including in combination a support having a front face, a positioning mark on said front face of said support, an annular vernier member mounted for angular movement relative to said housing, said vernier member having a front face, indicia on said front face of said vernier member, adjacent indicia on said front face of said vernier member being spaced increasing predetermined angular distances from each other, an annular block having a front face and being mounted for angular movement relative to said vernier member and said support, indicia on said front face of said annular block and being spaced at predetermined angular intervals, level means carried by said annular block for indicating a horizontal position, and means for selectively allowing and preventing relative angular movement of said vernier member and annular block with respect to said support.

7. A leveling device comprising a mounting block having groove means therein, a housing having a ridge means thereon interfittable into said groove means to prevent turning movement between said mounting block and said housing, means securing said housing and said block together and permitting sufficient longitudinal movement between said housing and said block to remove said ridge means from said groove means and thus permit turning movement between said block and said housing, an annular block residing in said housing and being secured thereto for relative rotational movement with respect thereto, level means carried by said annular block and indicating when said annular block is in a predetermined angular position relative to a horizontal plane, and indication means on said annular block and said housing to indicate relative rotational movement therebetween.

References Cited in the file of this patent

UNITED STATES PATENTS

| 2,129,695 | Karnes | Sept. 13, 1938 |
| 2,423,317 | Holton | July 1, 1947 |
| 2,659,975 | Van Gundy | Nov. 24, 1953 |
| 2,706,341 | Havens | Apr. 19, 1955 |
| 2,736,969 | Boyle | Mar. 6, 1956 |